Figure 1:
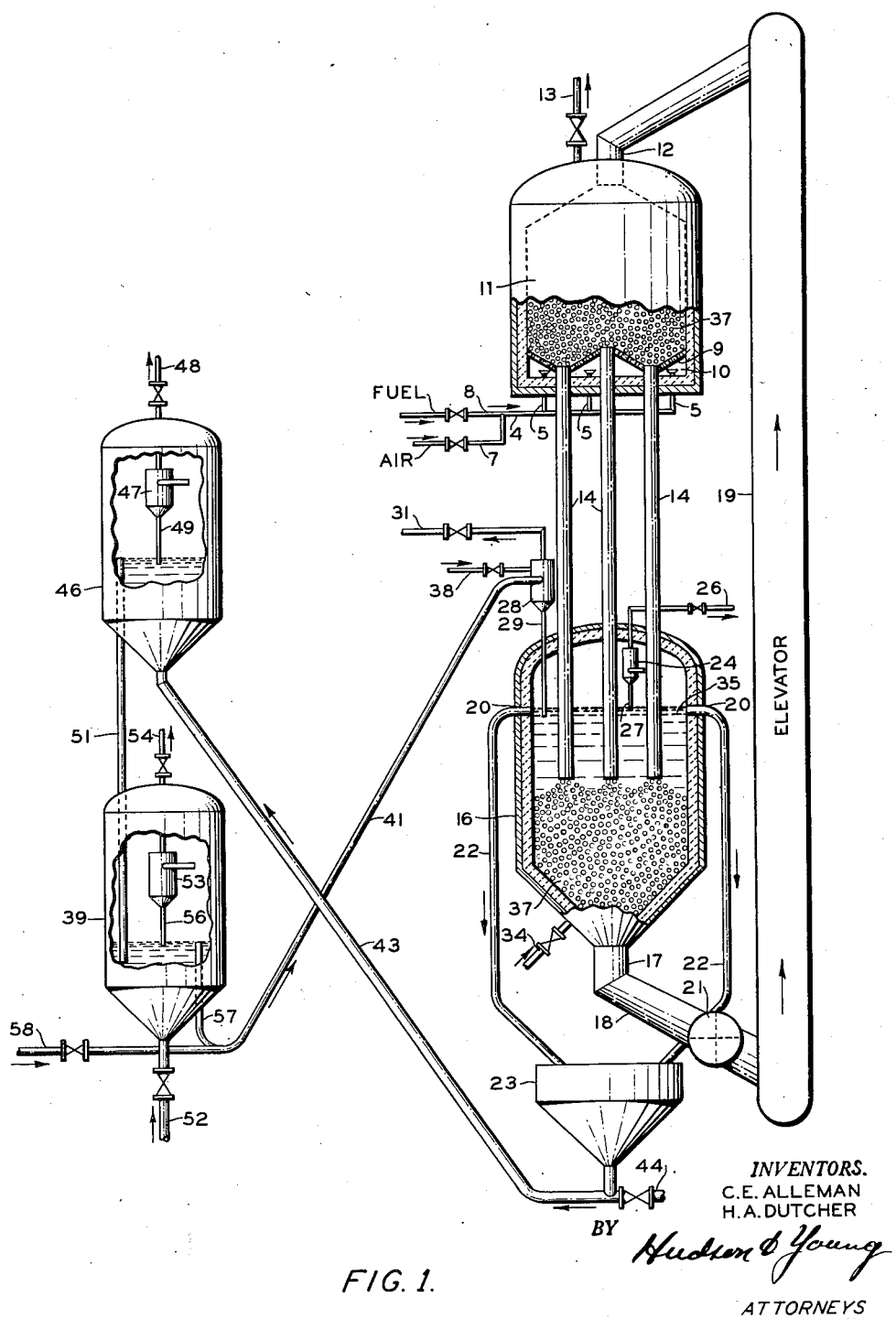

March 17, 1953 H. A. DUTCHER ET AL 2,631,967
PROCESS AND APPARATUS FOR CONVERTING REACTANT MATERIALS
Filed Dec. 19, 1949 2 SHEETS—SHEET 1

INVENTORS.
C. E. ALLEMAN
H. A. DUTCHER
BY
*Hudson & Young*
ATTORNEYS

March 17, 1953 — H. A. DUTCHER ET AL — 2,631,967
PROCESS AND APPARATUS FOR CONVERTING REACTANT MATERIALS
Filed Dec. 19, 1949 — 2 SHEETS—SHEET 2

INVENTORS
C. E. ALLEMAN
H. A. DUTCHER
BY
ATTORNEYS

Patented Mar. 17, 1953

2,631,967

UNITED STATES PATENT OFFICE 2,631,967

PROCESS AND APPARATUS FOR CONVERTING REACTANT MATERIALS

Harris A. Dutcher, Bartlesville, Okla., and Carl E. Alleman, Etter, Tex., assignors to Phillips Petroleum Company, a corporation of Delaware Application December 19, 1949, Serial No. 133,852

9 Claims. (Cl. 196—52)

This invention relates to the conversion of hydrocarbons. In one embodiment this invention relates to a conversion process wherein the reactant material is preheated for catalytic conversion, and then subjected to the intended catalytic treatment, without the occurrence of undesirable side reactions that ordinarily take place during the conveyance of the preheated reactant from the preheating zone to the catalytic reaction zone. In another embodiment this invention relates to the prevention of the accumulation and deposition of carbonaceous matter in the upper portion of a reaction chamber during the conversion of hydrocarbons therein. In another embodiment this invention relates to an improved process for the conversion of hydrocarbons in a pebble heater apparatus. In still another embodiment this invention relates to improved pebble heater apparatus.

Various known conversion processes involving gaseous reactants, particularly those conducted at temperatures within the limits of 1000 to 3000° F., are advantageously conducted in pebble heater apparatus. In many other instances, feed stocks for such conversion processes are preheated in a pebble heater apparatus and then transferred to a separate reaction zone, generally containing a catalyst, wherein the conversion proper is conducted.

Conversion or heating processes which are carried out in so-called pebble heater apparatus utilize a fluent mass of solid heat exchange material, which mass is heated to a high temperature by passing hot gas therethrough in a first direct heat exchange step, and is then caused to contact a gaseous reactant material, furnishing heat thereto in a second direct heat exchange. The conventional pebble heater apparatus generally comprises two chambers which may be disposed in substantially vertical alignment. The solid heat exchange material is introduced into the upper portion of the first chamber and forms a moving bed of solid heat exchange material which flows downwardly through the chamber in direct heat exchange with hot gaseous heat exchange material. The solid heat exchange material is thus heated to a high temperature and is then passed to a second chamber in which the hot solid heat exchange material is caused to contact the cool gaseous reactant materials in a second direct heat exchange relationship furnishing heat for the treatment or conversion of the gaseous reactant.

Conventional pebble heating chambers of pebble heater apparatus are generally formed as cylinders in which a solid heat exchange material is collected in the form of a moving bed. Hot gases are passed upwardly through the cylindrical bed, sometimes being introduced thereto at the periphery of the bed and at its lower end, and/or sometimes introduced through a refractory arch which supports the moving pebble bed. In one form of such apparatus, heat is supplied to the heating chamber by burning a fuel on the surface of the pebbles so as to heat the pebbles by combustion and further heating the pebbles by passing the resulting combustion gas upwardly through the downflowing fluent mass of pebbles. The heated pebbles are introduced into the upper portion of a reaction chamber and reactant materials are introduced into the lower portion of the reaction chamber and are caused to flow upwardly through the down-flowing fluent hot pebble mass therein, thereby obtaining the heat required for the requisite heat treatment, i. e. a conversion in situ, generally non-catalytic, or a preheat treatment for a conversion to be conducted in a separate reaction system. Gaseous reaction effluent is removed from the upper portion of the reaction chamber, generally at points above the surface of the pebble bed.

Solid heat exchange material which is conventionally used in pebble heater apparatus is generally called "pebbles." The term "pebbles" as used herein denotes any solid refractory material of flowable size and form having strength, which is suitable to carry large amounts of heat from a pebble heating chamber to the reaction chamber without rapid deterioration or substantial breaking. Pebbles conventionally used in pebble heater apparatus are substantially spherical in shape and range from about ⅛" to about 1" in diameter. In a high temperature process, pebbles having a diameter of between about ¼" and ⅜" are preferred. The pebbles must be formed of a refractory material which will withstand temperatures at least as high as the highest temperature obtained in the pebble heater chamber. The pebbles must also be capable of withstanding temperature changes within the apparatus. Refractory materials, such as metal alloys, ceramics, or other such materials, may be utilized to form such pebbles. Silicon carbide, alumina, periclase, thoria, beryllia, stellite, zirconia and mullite may be satisfactorily used to form such pebbles and when properly fired, serve very well at high temperatures. Pebbles which are used may be either inert or catalytic, as used in any selected process.

Conversions may be conducted either catalytically or non-catalytically in the reaction chamber of pebble heater apparatus, or, as already stated, the reactant gas can be preheated in the reaction chamber and transferred to a separate reaction system, i. e. for conversion outside the pebble heater apparatus. Catalytic conversions are more generally conducted by employing pebbles comprised of the selected catalytic material, such material being, for example, zirconia-alumina, silica-alumina, chromia, silica-zirconia-alumina, and the like. Various metal catalysts, particularly iron and nickel may be utilized in the form of pebbles.

There are numerous inherent difficulties involved in carrying out pebble heater operations of the type above discussed. For example, one disadvantage in the thermal non-catalytic conversion of hydrocarbons in a gas reaction chamber of a pebble heater apparatus, and in many instances of catalytic conversion, is the fact that some of the reaction products tend to condense and accumulate in the space above the pebble bed and adjacent the surface of the reaction chamber and decompose to form deposits of carbon and carbonaceous materials on the reaction chamber inner surface. The accumulation of such carbon deposits on the reaction chamber surface finally reaches such proportions as to seriously interfere with the removal of reaction products through the effluent outlet of the reaction chamber. Additional trouble is encountered when large fragments of the accumulated carbon material separate from the surface of the reaction chamber and pass downwardly through the chamber with the fluent mass of pebbles and become lodged in the pebble outlet of the chamber, thus reducing or preventing the flow of pebbles through the pebble heater apparatus.

When converting reactant materials in a pebble heater apparatus, the conversion reaction is inherently non-isothermal, due to the non-uniform pebble flow characteristics throughout various zones of the pebble mass, with the result that several different temperature levels may occur within the pebble mass at any given time, whereby over-reaction and/or under-reacting may take place with concomitant inefficient utilization of the reactants.

When preheating a reactant material in the pebble heater apparatus and then converting the preheated reactant in an external conversion system, large heat losses are often encountered during the conveyance of the preheated material to the zone of reaction, resulting in an overall inefficient heat transfer. Furthermore, during the time required for conveying the preheated reactant to the conversion zone, some uncontrolled reaction favoring undesirable side reactions takes place resulting in the formation of undesirable by-products and further inefficient utilization of reactant materials.

Our invention is concerned with the conversion of reactant materials in a single reaction chamber containing a moving contiguous pebble mass, particularly a gas reaction chamber of a pebble heater apparatus, wherein difficulties inherent in pebble heater operation of the type above discussed are overcome.

An object of this invention is to provide for the conversion of reactant materials at a temperature above about 800° F.

Another object is to provide for the utilization of a moving contiguous mass of pebbles in the conversion of gaseous reactants at elevated temperatures under isothermal conditions.

Another object is to prevent the deposition and accumulation of carbonaceous matter in the reaction zone of a pebble heater apparatus, in a process for the conversion of hydrocarbons.

Another object is to provide for preheating a reactant material and then subjecting the material thus preheated to catalytic conversion within a time of minimum duration.

Another object is to provide a process for the conversion of gaseous reactants at elevated temperatures wherein a moving contiguous mass of pebbles serves as a heat transfer medium in a reactant preheating step, and wherein a fluidized fixed bed of catalyst is maintained superposed on the pebble mass for effecting the intended conversion.

Another object is to provide a fluidized fixed bed of solid particulate material as a quench medium for cooling reaction effluent from a fluid catalytic reaction zone.

Other objects will be apparent to those skilled in the art from the accompanying discussion and disclosure.

In accordance with a preferred embodiment of our invention, we conduct the conversion of a gaseous reactant material in a gas reaction chamber of a pebble heater apparatus, by utilizing a moving contiguous pebble mass therein as a heat transfer medium to preheat the gaseous feed stock, and by conducting a catalytic conversion step in the same chamber in the presence of a separate bed of catalyst of small particle size maintained in a fluidized state, i. e., as a fluidized fixed bed, superposed directly on the pebble mass. When desired, we maintain a second fluidized bed of solids, at a lower temperature than that of the catalyst, above the fluidized catalyst bed as a reaction product quench medium, i. e. for absorbing heat from effluent emerging from the zone of fluid catalytic reaction. This second fluid bed can be composed of the catalytic material making up the fluid catalyst bed proper, or it may be made up of inert materials, as desired. When employing the term "fluid" or "fluidizable" herein, it is meant to designate that the solids or catalyst, referred to are fluidizable when utilized in the practice of our invention. Operating in accordance with our invention, some products of hydrocarbon conversion tending to condense from the effluent and to accumulate on the chamber walls, condense instead to a large extent on the catalyst surfaces and are removed in a subsequent catalyst regeneration. When operating at relatively high catalytic reaction temperatures, such as for example, 1300 to 1600° F., it is often advantageous to utilize the fluidized quench bed, under which conditions any easily condensible carbonaceous conversion product materials passed from the zone of fluid catalytic reaction condense on the cooler fluid quench particle surfaces. The carbonaceous materials thus deposited on the quench particle surfaces are removed in a subsequent burning step. Our invention provides for passing the preheated hydrocarbon reactant from the pebble mass to the catalyst in a time of minimum duration so that from a practical standpoint, no time has elapsed between reaching the maximum preheat temperature, and starting the catalytic reaction. By the practice of our invention we maintain the conversion reaction isothermal. These three features of our invention, i. e., (1) prevention of deposition and accumulation of carbonaceous materials in the reaction chamber when converting hydrocarbons, (2) the extremely short time required for passing fully preheated reactants from the pebble mass to the conversion zone, and (3) effecting isothermal reactant conversion in a pebble heater apparatus, represent important advantages over known methods for converting gases in pebble heater apparatus, because they provide for prolonged operating periods uninterrupted in any way by deposition of carbon materials in the reaction chamber, for more efficient conversion of the reactant feed to the desired product, and for more efficient heat transfer during the preheating and conversion steps.

Figures 2, 3:
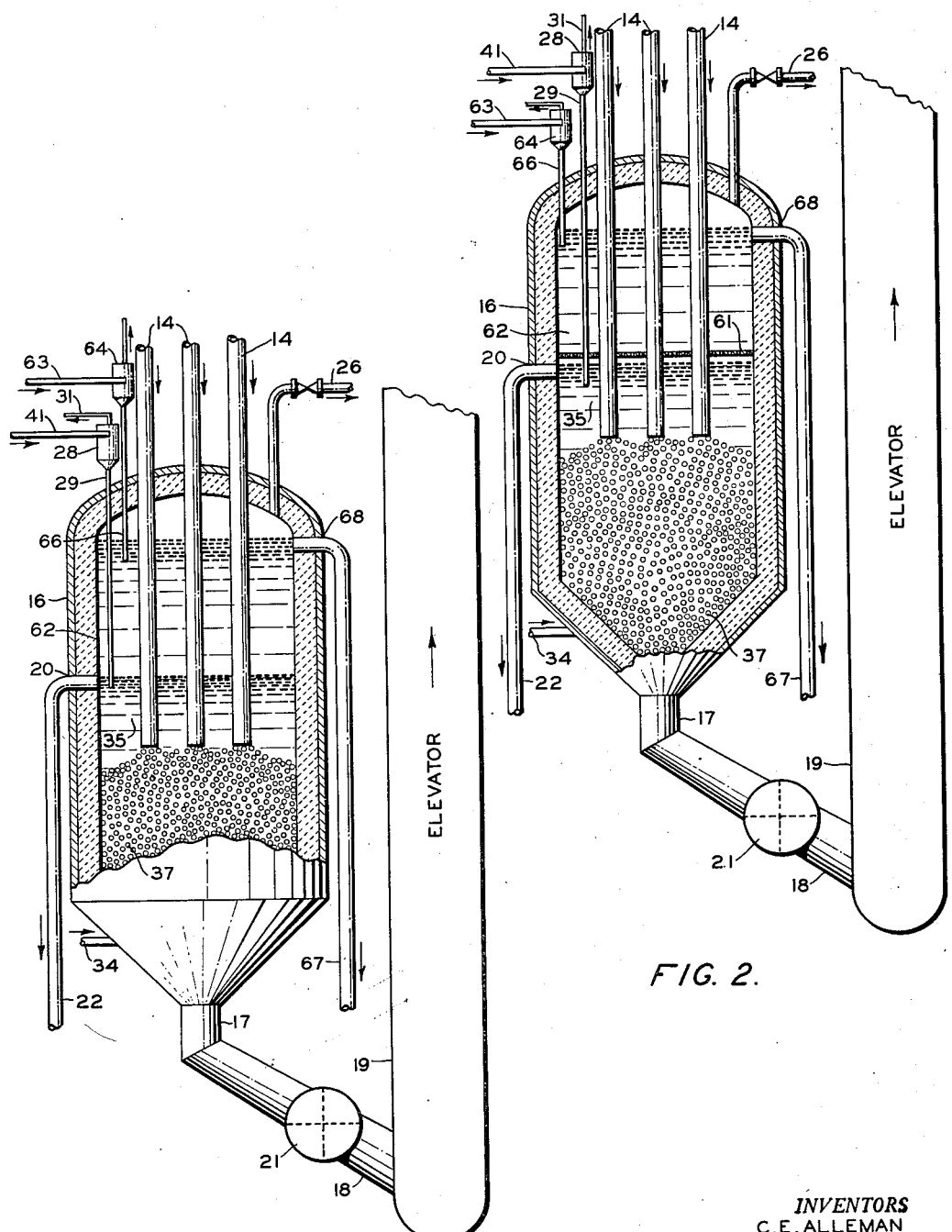

Understanding of the invention will be facilitated upon reference to the diagrammatic drawings in which Figure 1 is a schematic elevation of a pebble heater apparatus of this invention in which we may conduct a process of one embodiment of our invention. Figure 2 is a schematic elevation of a modification of the pebble heater apparatus of this invention in which a fluidizable layer of solid particulate quench material can be utilized in cooperation with the pebble mass and the fluidized fixed bed of catalyst illustrated in Figure 1. Figure 3 is a schematic elevation of pebble heater apparatus of this invention which is the same as that of Figure 2 except that in this latter figure is illustrated an embodiment of our invention wherein the perforate grid support for the layer quench solids, as illustrated in Figure 2, is unnecessary.

Referring to Figure 1, pebble heating chamber 11 is provided with a pebble inlet conduit 12 and gaseous effluent conduit 13. Combustion chamber 10 is positioned sub-jacent pebble heating chamber 11. Chambers 10 and 11 are separated by perforate pebble support 9, through which combustion gas formed in chamber 10 ascends. Fuel gas inlet conduit 6 is connected with chamber 10 and admits fuel into chamber 10 through conduits 4 and 5 for combustion. Conduit 7 connected with chamber 10 by conduits 4 and 5 admits air or other combustion supporting gas into chamber 10, in admixture with fuel from line 8. A plurality of pebble outlets 14 are connected with perforate pebble support member 9 each in communication with pebbles in chamber 11 and extending downwardly and equidistantly into the upper portion of reaction chamber 16 terminating therein at points, preferably near the middle, so as to permit formation of a pebble mass having a depth of at least one-fourth and not exceeding three-fourths of the depth of the reaction chamber. Pebble outlet conduit 17 is provided in the lower portion of reaction chamber 16 and communicates with elevator 19 by means of pebble conduit 18. Pebble feeder 21 is provided in conduit 18 to control the flow of pebbles therethrough. Conduits 22 are in communication with chamber 16 and are connected thereto at points 20 disposed about the periphery of its upper portion, preferably near the top, and terminate in central header 23. Cyclone separator 24 is disposed in the upper portion of chamber 16 above points 20 and has its gas outlet connected with conduit 26 extending through the upper portion of chamber 16. Conduit 27 is connected to the lower portion of cyclone separator 24 and extends downwardly into chamber 16 below points 20 to return solid particles separated from gaseous effluent in separator 24. Cyclone separator 28 receives fluidizable solids from conduit 41 fed by a gas lift and serves to separate solids from the lifting gas. Conduit 31 connected to the upper portion of cyclone separator 28 receives gas therefrom substantially free of suspended solids. Conduit 29 connected to the lower portion of separator 28 extends through the upper portion of chamber 16 terminating therein below points 20, similarly to conduit 27, to deliver solids from separator 28.

In the operation of the apparatus shown in Figure 1, pebbles are passed through pebble inlet conduit 12 into the upper portion of pebble heating chamber 11 so as to form a contiguous fluent gas-pervious mass of pebbles 37 extending from inlet 12 through chamber 11, pebble conduits 14, chamber 16 and line 17 as a downwardly moving contiguous mass of pebbles. Fuel from conduit 8 and air from conduit 7 are supplied to combustion chamber 10 through line 5, wherein the fuel is burned. Hot combustion gas thus formed is passed upwardly through the fluent pebble mass in direct heat exchange therewith so as to heat the pebbles to a predetermined high temperature. The temperature selected is necessarily higher than a desired preheat temperature discussed hereafter, generally from about 100 to 500° F. higher, dependent upon the specific preheat temperature sought and the quantity of reactant to be preheated. Generally, the proportion of oxygen and fuel and the quantity of these gases are selected so that the combustion gas is formed at a temperature sufficiently high to heat pebbles to a temperature of from 1000 to 2500° F. In an embodiment not specifically illustrated, fuel can be burned directly on the pebble surface, or hot gases from a source external to chamber 11 can be introduced through conduit 8 for effecting the desired heat exchange in chamber 11. Effluent combustion gas is removed from the upper portion of chamber 11 through conduit 13. Hot pebbles are withdrawn from chamber 11 through conduits 14 and form pebble mass 37 in chamber 16. A stream of catalytic material having a particle mesh size generally within the limits of from 60 to 200 mesh, i. e. particles of a size that will pass through a sieve having 60 openings per linear inch, but which will not pass through a sieve having more than 200 openings per linear inch, is introduced into chamber 16 and therein superposed on pebble mass 37. This is done by introducing the catalytic material from line 29 into chamber 16 either from fresh catalyst conduit 38 or from cooler 39, by way of conduits 57 and 41 and separator 28 as discussed more fully hereafter.

In the case of hydrocarbon cracking, the catalyst is generally a material such as silica-alumina, zirconia-alumina, silica-zirconia-alumina, chromia, and the like. Other catalytic materials include acid treated clays, bentonite, silica-magnesia, and the like.

Reactant material is introduced into the lower portion of chamber 16 through inlet conduit 34 and is passed upwardly through the reaction chamber in direct heat exchange with hot pebbles from chamber 11. In this manner, the reactant is preheated to the requisite temperature level for subsequent conversion in the presence of the superposed bed of fluidized catalyst. Hydrocarbon reactant may be introduced into chamber 16 either in liquid or gaseous form and in the case of the former, is immediately vaporized upon contact with hot pebbles. Gaseous hydrocarbon reactant preheated to the requisite conversion temperature in contact with hot pebbles in zone 16, is passed upwardly through the superposed catalyst at a linear velocity sufficiently high to maintain the catalyst in a fluidized state, i. e. as a fluidized fixed bed 35. Good fluidization of catalyst bed 35 is obtained over a broad range of linear velocity conditions of reactant gases in zone 16, and under these conditions, none of the solid particles from mass 35 can enter the subjacent pebble mass.

By this method of operation the preheated reactants pass from the preheating zone to the catalytic reaction zone in a minimum time, and, as a result, undesirable side reactions are substantially eliminated and the reaction material is quickly and efficiently converted to the desired product in maximum yield. Also, the fluidized fixed bed of catalyst, made up of continuously and rapidly moving catalyst particles effects an even distribution of heat throughout the fluidized catalyst mass, rendering the conversion isothermal. Any deposition and accumulation of carbonaceous materials on the upper portion of the walls of chamber 16 is substantially prevented in the practice of this embodiment for the reason that the catalyst mass 35 operates at a temperature lower than that of pebble mass 37 whereby at least a major portion of tarry or otherwise heavy carbon-bearing product material condenses and accumulates on the surface of particles of fluid catalyst 35 which are then removed, as discussed hereafter.

When converting hydrocarbons in chamber 16, particles of fluidized catalyst mass 35 become partially spent as a result of the deposition and accumulation of carbonaceous material on the catalyst particle surfaces, and unless regenerated, it will soon become totally deactivated. Catalyst particles bearing carbonaceous matter are removed from chamber 16, regenerated, and then returned. This is done by continuously adding fluid particles regenerated as discussed hereafter to chamber 16 through line 29 and continuously withdrawing "partially coked" solid particles from layer 35 through outlet conduits 22. Partially spent catalyst is passed from chamber 16 to header 23 through conduits 22 and transferred by air-lift to regeneration zone 46 by a stream of air from line 44 introduced into line 43 upstream from header 23. The temperature of fluid catalyst passed from header 23 is often as high as from 800 to 1500° F., or higher if desired, thereby causing carbonaceous deposits on the catalyst particle surfaces to burn upon contact with air. Air is introduced through line 44 in adequate quantity to at least partially burn carbonaceous material from the particle surfaces and thereby restore the activity of the catalyst. The combustion occurs chiefly in chamber 46. Regeneration off-gas comprising combustion gas, together with any excess air or inert lift gas, is separated from solid particles in zone 46 by means of cyclone separator 47. Regeneration off-gas substantially free from solids is passed from separator 47 through gas effluent conduit 48. Solids separated in separator 47 are returned to the main body of solids in zone 46, through conduit 49. Hot solids are passed through overflow conduit 51 to fluid catalyst cooling chamber, or storage, 39. Any desired cooling of catalyst in storage chamber 39 is effected by dispersing cooling gas from conduit 52 such as air, flue gas, and the like, at any desired temperature in the desired amount. Cooling gas and solids in the upper portion of chamber 39 are separated in cyclone separator 53. Effluent gas substantially free of solids is passed from separator 53 through line 54, and solids from separator 53 are returned to the main body of solids in chamber 39 through line 56. Regenerated fluid catalyst is withdrawn by gravity from zone 39 through overflow line 57 and passed into line 41 and separator 28 by means of a lift gas, usually air introduced into line 41 from line 58. Lift gas is separated from regenerated catalyst in cyclone separator 28 and discharged through line 31. Regenerated catalyst is passed from separator 28 through line 29 into fluid catalyst mass 35.

It is thus seen from the foregoing discussion that fluid catalyst mass 35 is a fluidized fixed bed of catalyst containing particles continuously moving through zone 16, and that in the operation of this embodiment of our invention, we utilize a plurality of beds of moving solid particulate matter in a single reaction chamber.

With reference to Figure 2, another embodiment of our invention is illustrated wherein a perforate plate 61 may be placed immediately above the fluidized catalyst mass 35 above points 29, and a bed of fluidized solids 62 maintained on the plate, at a temperature sufficiently low to effectively quench the products of reaction emerging from fluid catalyst 35. By this modification the time required for passing the reaction product gas from the catalyst zone into the quench zone is very short so that any undesirable side reactions that may ordinarily take place during the transfer of the reactant gases to the quench zone, are substantially prevented.

The solids in the quench bed 62 and in the catalyst bed 35 may be the same catalytic material, or, quench particles 62 may be inert, the chief difference in these two beds being their respective temperatures. Ordinarily, it is most advantageous to maintain quench bed 62 at a temperature of from 100 to 1000° F. below the temperature of fluid catalyst 35. In this embodiment any tarry carbon-rich product materials not condensed on the particle surfaces of catalyst 35 condense and accumulate on the surfaces of the particles of the quench bed 62 and are thereby prevented from accumulating in the top of zone 16. Fluidized catalyst 35 to be regenerated is passed from zone 16 via line 22 to a regeneration zone as illustrated in the discussion of Figure 1. Regenerated catalyst is reintroduced into zone 16 from line 41 and cyclone separator 28 and line 29 as already discussed. Solid particles are introduced into zone 16 to form quench bed 62, through line 63, cyclone separator 64 and line 66, from a regeneration zone similar to regeneration chamber 46, and not specifically illustrated. Particles from bed 62, heated by absorbing heat from product gases, and having carbonaceous materials deposited on their surface when hydrocarbons are converted in the zone of fluid catalyst 35, are passed from zone 16 through conduit 67 connected with chamber 16 at a point 68 above bed 62 and preferably near the top of the reaction chamber, and passed to a regeneration system similar to regeneration chamber 46 of Figure 1, and not specifically illustrated. The openings of perforate plate 61 obviously are sufficiently small as to prevent flow of particles from quench layer 62 into fluidized catalyst 35, when product gases are flowing upward therethrough at the rate required to fluidize the particles of catalyst bed 35.

With reference to Figure 3, another embodiment is illustrated wherein the process may be conducted in accordance with that illustrated by Figure 2 except that conditions are maintained whereby the quench bed 62 is maintained as a fluidized fixed bed superposed on fluidized fixed bed 35 without the need for perforate plate 61. In this modification the catalyst bed is composed of relatively large fluidized particles, generally from 40 to 150 mesh, while the quench bed is composed of very fine particles, generally smaller than 200 mesh and in the range of 200-300 mesh. With this difference in particle size in the two layers, 62 and 35, mixing of the two beds is minimized. Generally, we prefer to utilize relatively low gas velocities in the practice of this embodiment and to employ quench material of a lower mass-to-surface ratio than that of the chosen catalyst. This embodiment provides therefore for the utilization of a moving pebble mass, a fluidized fixed catalyst bed and fluidized fixed quench bed maintained superposed one on the other and segregated. We prefer to keep the catalyst in a dense phase fluidized state but we can maintain the quench bed in light phase fluidization in view of the fact that the quench material can be transported from chamber 16. This feature provides for efficient control of preheating, reacting and quenching and is especially suited for high velocity reactions. Linear velocities utilized in the practice of our invention may be selected over a broad range and are dependent upon the fluid catalyst particle size and the actual density thereof. Satisfactory fluidization can be obtained when employing linear gas reactant velocities in the range of 0.5 to 5 feet per second and can be selected from a broad range of values.

We have illustrated our invention in terms of a plurality of pebble inlet conduits 14, although a single substantially axially disposed inlet 14 may be employed, if desired.

It will be obvious to one skilled in the art that the bed depth of either fluidized bed or both may be varied by such means as varying the levels of such outlet conduits as 22, 29, 66, and 67.

As will be evident to those skilled in the art, various modifications of this invention can be made, or followed, in the light of the foregoing disclosure and discussion, without departing from the spirit or scope of the disclosure or from the scope of the claims.

We claim:

1. An improved method for reacting hydrocarbons, comprising passing a fluent mass of pebbles into the upper portion of a pebble heating zone and downwardly therein by gravity; passing hot gaseous heat exchange material upwardly through said pebble heating zone in direct heat exchange with pebbles therein to heat said pebbles to a temperature sufficiently high to transfer heat to a hydrocarbon reactant to heat same when in contact therewith to a temperature within the limits of 900-1500° F., removing effluent from the upper portion of said pebble heating zone, gravitating heated pebbles from said pebble heating zone through an unobstructed interconnecting zone into a reaction zone and downwardly through the last said zone to form a contiguous pebble mass therein, passing a stream of solid particulate catalytic material containing particles not larger than 60 mesh and not smaller than 200 mesh on to said pebble mass in said reaction zone to form a catalyst layer superposed on said pebble mass, passing a hydrocarbon reactant into a lower portion of said reaction zone and upwardly therethrough in direct heat exchange with hot pebbles therein to preheat same for catalytic conversion described hereafter, whereby said hydrocarbon reactant is preheated to a temperature within the limits of 900-1500° F., passing preheated reactant material from said pebble mass upwardly through said superposed catalyst layer at a linear velocity sufficiently high to maintain said catalytic material as a fluidized fixed bed, whereby catalytic conversion of said hydrocarbon takes place, said fluidized catalyst becoming at least partially deactivated during said conversion as a result of an accumulation of carbonaceous matter on its particle surfaces, withdrawing fluidized catalyst at least partially deactivated from the zone of catalytic conversion and regenerating same by burning carbonaceous matter from the catalyst particle surfaces, passing regenerated catalyst into said fluidized fixed catalyst bed, removing pebbles from a lower portion of said reaction zone and returning same to said pebble heating zone, and removing reaction products from an upper portion of said reaction zone.

2. The process of claim 1 wherein a layer of solid fluidizable quench material comprising particles having a smaller mass-to-surface ratio than those of said catalytic material is maintained as a layer superposed on said layer of catalytic material while at a temperature lower than that of said catalyst.

3. An improved method for converting a reactant material at an elevated temperature, comprising heating a fluent mass of pebbles in a pebble heating zone to a temperature sufficiently high to transfer heat to a reactant material so as to heat same to a predetermined temperature level when in contact with said pebbles in a subsequent reactant preheating step, gravitating heated pebbles from said pebble heating zone through an unobstructed interconnecting zone into a reaction zone and downwardly through the last said zone to form a hot contiguous pebble mass therein, passing a stream of solid fluidizable catalytic material into said reaction zone above said pebble mass and maintaining a layer of said catalyst superposed on said pebble mass, passing a stream of solid fluidizable quench material into the upper portion of said reaction chamber above said layer of catalyst and maintaining a layer of said quench material superposed on said layer of catalyst, said quench material comprising particles having a smaller mass-to-surface ratio than those of said catalytic material and being at a temperature lower than that of said catalyst, passing reactant material into a lower portion of said reaction zone and upwardly therethrough in direct heat exchange relation with hot pebbles therein to preheat said reactant for catalytic conversion described hereafter, passing preheated reactant material from said pebble mass upwardly through said fluidized catalytic layer at a linear velocity sufficiently high to maintain said catalyst as a fluidized fixed bed, whereby conversion of said reactant takes place, passing resulting reaction products from said fluidized catalyst layer upwardly through said layer of fluidizable quench material whereby the cooler quench material absorbs heat from the reaction product, said fluidized catalyst becoming at least partially deactivated during said conversion as a result of an accumulation of some product material on its particle surfaces, some product materials from said reaction products accumulating on the surfaces of particles of said fluidizable quench material, withdrawing hot quench material from said reaction zone and removing product materials from its particle surfaces, cooling same and returning a stream of cooled quench material free of product materials to said superposed layer of quench material in said reaction zone, withdrawing catalyst at least partially spent from said reaction zone and regenerating same by removing product materials from its particle surfaces, returning regenerated fluid catalytic material to said layer of fluid catalyst in said reaction zone, removing pebbles from a lower portion of said reaction zone and returning same to said pebble heating zone, and removing reaction products from an upper portion of said reaction zone.

4. An improved method for converting a hydrocarbon reactant material at an elevated temperature, comprising heating a fluent mass of pebbles in a pebble heating zone to a temperature sufficiently high to transfer heat to said hydrocarbon reactant so as to heat same to a temperature within the limits of 900–1500° F. when in contact with said pebbles in a subsequent preheating step, removing effluent from the upper portion of said heating zone, gravitating heated pebbles from said pebble heating zone through an unobstructed interconnecting zone into an upper portion of a reaction zone to form a contiguous downwardly moving pebble mass in the last said zone heated as above described, passing a stream of solid catalytic material containing particles not larger than 40 mesh and not smaller than 200 mesh into the upper portion of said reaction zone onto said pebble mass to form a layer of said catalyst superposed on said pebble mass, passing a stream of solid quench material containing particles not larger than 200 mesh and not smaller than 400 mesh into the upper portion of said reaction chamber above said layer of catalytic material to form a layer of quench material superposed on said catalyst layer, said quench material being at a temperature of from 100–1000° F. lower than that of said catalyst, passing hydrocarbon reactant material into a lower portion of said reaction zone and upwardly therethrough in direct heat exchange relation with hot pebbles therein to preheat said reactant for catalytic conversion described hereafter, passing preheated hydrocarbon reactant material from said pebble mass upwardly through said fluid catalytic layer at a linear velocity sufficiently high to maintain said catalyst as a fluidized fixed bed, whereby conversion of said reactant takes place, passing resulting reaction products from said fluid catalyst layer upwardly through said layer of fluid quench material, whereby the cooler quench material is maintained as a fluidized fixed bed, and absorbs heat from the reaction product; said fluidized catalyst becoming at least partially deactivated during said conversion as a result of an accumulation of carbonaceous matter on its particle surfaces, carbonaceous material from said reaction products accumulating on the surfaces of particles of said fluid quench material, withdrawing hot quench material from said reaction zone and removing carbonaceous matter from its particle surfaces, cooling same, and returning a stream of cooled fluid solid quench material free of carbonaceous matter to said superposed layer of quench material in said reaction zone, withdrawing at least partially spent fluid solid catalyst from said reaction zone and regenerating same by removing carbonaceous matter from its particle surfaces, returning regenerated fluid catalytic material to said layer of fluid catalyst in said reaction zone, removing pebbles from a lower portion of said reaction zone and returning same to said pebble heating zone, and removing reaction products from an upper portion of said reaction zone.

5. The process of claim 3 wherein said quench material is of the same chemical composition as said fluid catalytic material.

6. An improved pebble heater apparatus which comprises in combination, a vertically disposed closed cylindrical pebble heating chamber; a pebble inlet and an effluent outlet in the upper portion of said heater chamber; a vertically disposed closed cylindrical reaction chamber below said heating chamber; a plurality of pebble outlet conduits in the lower portion of said heating chamber and extending downwardly and equidistantly into said reaction chamber and terminating therein at a level to permit gravitational formation in said reaction chamber of a pebble mass having a depth of at least one-fourth and not exceeding three-fourths of the depth of said reaction chamber; a pebble outlet conduit in the lower portion of said reaction chamber; a plurality of fluid solids outlet conduits in the side walls of said reaction chamber and disposed at equal vertical distances from its upper end at points above the ends of said pebble outlet conduits terminating therein; an inlet conduit extending into the upper portion of said reaction chamber for admitting fluid solids thereinto and terminating at a point below said fluid solids outlets and above the ends of said pebble outlets terminating therein; heating material inlet means in the lower portion of said heating chamber; effluent outlet means extending from the upper portion of said reaction chamber; an inlet conduit in the lower portion of said reaction chamber for admitting reactant material; and an elevator extending between said pebble outlet in said reaction chamber and said pebble inlet in said heater chamber.

7. An improved pebble heater apparatus which comprises in combination a vertically disposed closed cylindrical pebble heating chamber; a pebble inlet and an effluent outlet in the upper portion of said heating chamber; a vertically disposed closed cylindrical reaction chamber below said heating chamber; a plurality of pebble outlet conduits in the lower portion of said heating chamber and extending downwardly and equidistantly into said reaction chamber and terminating therein at a level to permit gravitational formation in said reaction chamber of a pebble mass having a depth not less than one-fourth and not greater than three-fourths of the depth of said reaction chamber; a pebble outlet in the lower portion of said reaction chamber; at least one first fluid solids outlet conduit in the side wall of said reaction chamber intermediate its upper end and the ends of said pebble outlets terminating therein; at least one second fluid solids outlet conduit in the side wall of said reaction chamber above said first fluid solids outlet conduit; a first inlet conduit extending into the upper portion of said reaction chamber for admitting fluid solids and terminating in said reaction chamber at a point below said first fluid solids outlet and above the ends of said pebble outlets terminating therein; a second inlet conduit extending into the upper portion of said reaction chamber for admitting fluid solids and terminating at a point below said second fluid solids outlet conduit and above said first fluid solids outlet conduit; heating material inlet means in the lower portion of said heating chamber; an inlet conduit in the lower portion of said reaction chamber for admitting reactant material; and an elevator extending between said pebble outlet in said reaction chamber and said pebble inlet in said heating chamber.

8. The apparatus of claim 6 wherein said plurality of fluid solids outlet conduits terminate in a single outlet header.

9. The apparatus of claim 7 wherein a horizontal perforate plate for supporting a fluidized bed of solids containing particles of a size not smaller than 200 mesh, is disposed intermediate said first and second fluid solids outlets.

HARRIS A. DUTCHER.
CARL E. ALLEMAN.

REFERENCES CITED

The following references are of record in the file of this patent:

UNITED STATES PATENTS

| Number    | Name       | Date          |
|-----------|------------|---------------|
| 2,393,636 | Johnson    | Jan. 29, 1946 |
| 2,446,247 | Scheineman | Aug. 3, 1948  |
| 2,479,496 | Keith      | Aug. 16, 1949 |
| 2,503,291 | Odell      | Apr. 11, 1950 |